(12) United States Patent
Ghahramani

(10) Patent No.: US 7,394,363 B1
(45) Date of Patent: *Jul. 1, 2008

(54) INTELLIGENT MULTI PURPOSE EARLY WARNING SYSTEM FOR SHIPPING CONTAINERS, COMPONENTS THEREFOR AND METHODS OF MAKING THE SAME

(76) Inventor: Bahador Ghahramani, 5803 S. 174th St., Omaha, NE (US) 68135

( * ) Notice: Subject to any disclaimer, the term of this patent is extended or adjusted under 35 U.S.C. 154(b) by 0 days.

This patent is subject to a terminal disclaimer.

(21) Appl. No.: 11/640,679

(22) Filed: Dec. 18, 2006

Related U.S. Application Data

(60) Continuation of application No. 11/058,876, filed on Feb. 16, 2005, now Pat. No. 7,158,028, which is a continuation-in-part of application No. 10/674,761, filed on Sep. 30, 2003, now Pat. No. 6,876,308, which is a continuation of application No. 10/234,259, filed on Sep. 4, 2002, now Pat. No. 6,664,898, which is a continuation of application No. 09/901,792, filed on Jul. 9, 2001, now Pat. No. 6,480,115, which is a division of application No. 09/306,171, filed on May 6, 1999, now Pat. No. 6,259,373.

(60) Provisional application No. 60/085,159, filed on May 12, 1998.

(51) Int. Cl.
*G08B 1/08* (2006.01)

(52) U.S. Cl. ............. 340/539.22; 340/521; 340/539.26; 340/540; 340/541

(58) Field of Classification Search ............ 340/539.22, 340/539.26, 521, 540, 541, 572.1, 539.29, 340/539.1, 632, 550, 331, 545.6, 522, 309.16, 340/5.8, 5.92, 539; 235/384, 385; 705/28; 700/299, 301; 702/19, 22, 130, 140
See application file for complete search history.

(56) References Cited

U.S. PATENT DOCUMENTS 5,347,274 A * 9/1994 Hassett ........................ 340/988
(Continued)

OTHER PUBLICATIONS

Mizar Technologies, 1931 Georgetown Road, Hudson, OH 44236, Alert Container, www.ccatsandiego.org.
(Continued)

*Primary Examiner*—Thomas J Mullen, Jr.
(74) *Attorney, Agent, or Firm*—Richard L. Marsh

(57) ABSTRACT

A multipurpose sensing system of detecting, qualifying and quantifying a potential threat to national security comprises a multipurpose sensing module associated with each cargo carrying container. The system tracks the instantaneous location of each cargo carrying container with the multipurpose sensing module on board each cargo carrying container sampling the contents thereof for the presence of material selected from the group comprising nuclear, biological and chemical grade weapons material. The multipurpose sensing module has an external signaling device associated therewith, the external signaling device disposed remote from the multipurpose sensing module and externally of the cargo carrying container wherein the external signaling device is lighted when the multipurpose sensing module senses the presence of the material and wherein the external signaling device remaining activated until corrective action has been taken to neutralize the material and return the cargo carrying container to a safe state.

20 Claims, 3 Drawing Sheets

U.S. PATENT DOCUMENTS

| | | | | |
|---|---|---|---|---|
| 5,557,108 | A | * | 9/1996 | Tumer .................. 250/390.04 |
| 6,317,029 | B1 | | 11/2001 | Fleeter |
| 6,930,596 | B2 | * | 8/2005 | Kulesz et al. ............ 340/539.1 |
| 6,965,314 | B2 | * | 11/2005 | Bohinc, Jr. ............ 340/539.26 |
| 2004/0043443 | A1 | * | 3/2004 | Lejeune ....................... 435/29 |
| 2004/0174259 | A1 | * | 9/2004 | Peel et al. ............. 340/539.26 |
| 2004/0233055 | A1 | * | 11/2004 | Canich et al. ......... 340/539.26 |
| 2005/0088299 | A1 | * | 4/2005 | Bandy et al. .......... 340/539.16 |
| 2005/0253703 | A1 | * | 11/2005 | He et al. ............... 340/539.13 |

OTHER PUBLICATIONS

Chemical Warfare Agent & High Explosive Identification, Caffrey, et al., 1992 IEEE Transactions.
Biological Agent Detector, McGowan, et al., 1994 IEEE MTT-S Digest, pp. 513-516.
Chemical Reactions for Neutralizing Chemical Warfare Agents, Chang, Chemistry & Industry, May 1, 1995.
Sensors and Circuits, Joseph J. Carr, Prentice-Hall, Englewood Cliffs, NJ, 1993.

* cited by examiner

INTELLIGENT MULTI PURPOSE EARLY WARNING SYSTEM FOR SHIPPING CONTAINERS, COMPONENTS THEREFOR AND METHODS OF MAKING THE SAME

CROSS REFERENCE TO RELATED APPLICATION

This application is a continuation of Applicant's application Ser. No. 11/058,876, filed on 16 Feb. 2005, now U.S. Pat. No. 7,158,028 B1, which is a continuation-in-part application of Ser. No. 10/674,761 filed Sep. 30, 2003, now U.S. Pat. No. 6,876,308 B1, which is a continuation of Applicant's parent patent application Ser. No. 10/234,259 filed on Sep. 4, 2002, now U.S. Pat. No. 6,664,898 B1, which is a continuation of Applicant's parent patent application Ser. No. 09/901,792 filed on Jul. 9, 2001, now U.S. Pat. No. 6,480,115 B2, which is a continuation of Applicant's parent patent application Ser. No. 09/306,171 filed on May 6, 1999, now U.S. Pat. No. 6,259,373, issued on 10 Jul. 2001 which is a non-provisional application under 35 U.S.C. 111(a) of provisional application 60/085,159 filed on May 12, 1998.

BACKGROUND OF THE INVENTION

1. Field of the Invention

This invention relates to an intelligent marker for detecting multiple hazards within a container, the intelligent marker also having means for communicating with a remote station the presence of the hazards.

2. Prior Art Statement

Policies recently set forth in US Government mandated Customs-Trade Partnership Against Terrorism ("C-TPAT") requires "Technology to scan container contents for weapons of mass destruction (WMD)."

There are 12 million cargo containers in the worldwide inventory. These containers move back and forth among major seaports more than 200 million times each year. Every day, more than 21,000 containers arrive at U.S. seaports from foreign countries filled with consumer goods—from televisions to clothing to toys. In fact, about 90 percent of U.S. bound cargo moves by container. It is also estimated that only 2 percent of the containers are screened for hazardous materials. The United States maritime industry contributes $742 billion to the gross domestic product each year. While availability of solutions for physical security of containers is increasing, electronic technology for early detection of WMD and theft of cargo is just emerging. Electronic technology to scan and monitor cargo contents is an important complement to the existing and future physical security measures. The current manual verification of contents that takes place at many ports around the world is costly, time consuming, and very prone to error.

One known system is the "Alert Container" by Mizar Technologies, LLC, 1931 Georgetown Road, Hudson, Ohio 44236 which tracks cargo by GeoPositional Satellite. The Alert Container has a plurality of locking bars bridging the door of the container which will signal intrusion through the door of the container. According to the literature, the Alert Container can also detect radiation, chemical, bio-hazards, WMD and contraband contained within the container, however, it should readily apparent that those hazards would need to be outside the container for the locking bars to detect the material. Furthermore, when entry to the container is gained through one of the walls, the end opposite the door or the top of the container, the locking bars of the Alert Container would not provide a signal. Thus, there is a great need for a multipurpose early warning system which comprises an multipurpose early warning module that is housed within the container to provide for instantaneous alert of radiation, chemical, bio-hazards, WMD or contraband that may be introduced into the container or intrusion into the container through a portal other than the door.

It is known to provide a system for locating and sensing objects and providing alerts by emplacing a plurality of remote localized sensing devices which are associated with the objects wherein the localized sensors provide sensor data to a remote localization and sensing device which in turn transmits location and sensor data to an application service provider for access by an end user through a common communication network. Contents of a container may be input into the localized sensor each time the container is loaded or may be associated with a RFID tag identifying the container. Certain parameters keyed to appropriate alert threshold values may be monitored on a random, timed or continuous basis and may be triggered by stimuli from the localized sensor. In one instance, the instantaneous location of the shipment and the onboard quality of food during transit may be monitored by temperature, humidity or gas sensors providing data to the remote localization and sensing device associated with the transportation vehicle. In another instance, the instantaneous location of an overseas shipment may be found by the end user by keying in the RFID tag of a particular container. For instance, see the U.S. Pat. No. 6,847,892 B2 issued on Jan. 25, 2005 to Zhou, et al. Zhou, et al., fail to provide for identification of foreign material, contraband, personnel or weapons of mass destruction which may be surreptitiously introduced into the container. Therefore, there is a need for a system that can identify foreign material introduced into a shipping container.

Monitoring of single parameter sensors by narrow angle satellites of a satellite communications system in order to obtain mapping data of the parameter is fully described in U.S. Pat. No. 6,317,029 B1, issued on 13 Nov. 2001 to Richard David Fleeter. The location of the single parameter sensor may be known when the single parameter sensor transmits a signal indicating presence of the parameter or optionally when interrogated. In the case of a null transmission, the satellite communications system assumes the last transmitted location of the single parameter sensor as the current location. Means to activate the single parameter sensor is provided by transmission from the satellite communications system. Thus, it is taught that there is no need to identify each individual sensor with a key tag system, however, it is readily apparent that numerous satellites would be necessary in order to cover sufficient area to obtain accurate mapping data as the narrow angle satellite covers only a narrow band on each pass around the earth or a narrow area if fixed in orbit. Furthermore, without specific identification, it is impossible to determine which single parameter sensor is not properly functioning. In the case of mapping the presence of WMD, identification of location is primary and a non-functioning single parameter sensor would pass WMD undetected.

It is further known to identify certain hazards by spectroscopy. For instance, see the article by Caffrey, et al., "Chemical Warfare Agent and High Explosive Identification by Spectroscopy of Neutron-Induced Gamma Rays," IEEE Transactions on Nuclear Science, Vol. 39, No. 5.

Also known is to detect certain biological hazards using a surface transverse wave resonator. For instance, see the article by McGowan, et al., "Biological Agent Detector using a Surface Transverse Wave Resonator: Preliminary Report," 1994 IEEE MTT-S Digest, TU4D-4.

It is further known to neutralize CW agents. For instance, see the article by Yu-Chu Yang, "Chemical Reactions for Neutralising Chemical Warfare Agents," published in the 1 May 1995 issue of Chemistry & Industry, Vol. 8, pp 334-337.

Known sensors and circuits are described in the book by Joseph J. Carr, *Sensors and Circuits* published by Prentice-Hall, Englewood Cliffs, N.J., 1993.

SUMMARY OF THE INVENTION

It is an object of this invention to provide an intelligent multipurpose early warning system for detecting the presence of personnel and a means for determining the presence of ABC (Atomic, Biological and Chemical, now known as NBC, Nuclear, Biological and Chemical) hazards, which may be employed as weapons of mass destruction (WMD) within a shipping or cargo container and a means for communicating.

It is still another object of this invention to provide a multiple purpose early warning system having means for communicating including means for receiving radio frequency signals from remote transmitters, the means for communicating receiving information from a station remote from a multiple purpose early warning module deployed within a shipping or cargo container such as a ship borne shipping container, wheeled transport vehicle such as a over-the-road truck, rail car or aircraft.

A goal of this invention is to provide a multipurpose early warning system of this invention that can change to meet the shipping and cargo industry needs and thus is superior to all similar products currently in the market. The multipurpose early warning system can detect multiple nuclear or chemical agents by integrating sensors, circuit boards and transmission devices into one working unit designed to provide early warning of dangerous and hazardous elements. In addition, intrusion sensors are included which will be effective against container cargo theft. The embedded sensors are activated upon detecting an agent not initially placed within the container and a means for signaling signals the software to send a communication. This communication not only activates a visual marker at the container but it also sends the detected information to a satellite communication system. The satellite communication system relays the information to a remote control center which may be an office, a PDA, or a handheld GPS device. The data is then compiled and proper authorities are notified in ample time to effect appropriate action. Instantaneous location is provided in real time which coupled with the alerts transmitted by the multipurpose early warning module within any given shipping container will help in effective management of supply chain and prevention of WMD from entering a country through its sea ports.

A significant purpose of this invention is to provide a multi-tiered multipurpose early warning system for safety and security of shipping containers by monitoring cargo prior to loading, monitoring loaded cargo while awaiting shipment, during shipment and after arrival and randomly monitoring selected cargo containers at any point in the process. Monitoring cargo prior to loading is accomplished with a multipurpose early warning sensor module sampling the cargo at the point of loading. Monitoring loaded cargo is done with multipurpose early warning sensor module that is resident within the container after loading and primary sealing, the multipurpose early warning sensor module sampling the environment within a container for personnel, WMD and/or hazards introduced into the container after loading. Monitoring of cargo randomly is accomplished by a portable multipurpose early warning sensor module used for sampling the environment within selected containers after loading and sealing to ensure that the loaded cargo container has not been compromised. Shippers will appreciate the versatility of the portable multipurpose early warning sensor module for that purpose, however, the portable multipurpose early warning sensor module will be particularly useful for law enforcement and surveillance personnel when acting upon a tip that tampering may have occurred on at least one cargo container.

It is a further object of this invention to provide a multiple purpose early warning module which can be reprogrammed from a station remote from the multiple purpose early warning module deployed within a shipping or cargo container.

Finally, an intention of this invention is to provide an effective solution that automates the existing manual, time consuming and inefficient function of tracking cargo containers for a fraction of the cost using a more effective, reliable, and modern technology. In addition, the system of this invention will address the $50 Billion of high value merchandise stolen annually and it also addresses the growing demand for supply chain visibility. The technology disclosed herein provides the identification of each container and its position in the supply chain, this has security as well as supply chain planning benefits. The system of this invention provides real time alerts to critical events in the supply chain helping to make critical supply management decisions as early as possible. One additional benefit of the multipurpose early warning module and multipurpose early warning system of this invention is its flexibility as the multipurpose early warning system and its modules can be customized to customers' needs as will become readily apparent with a reading of the following description.

DESCRIPTION OF THE PREFERRED EMBODIMENTS

While the various features of this invention are hereinafter described and illustrated as an intelligent multipurpose early warning system comprising at least one multipurpose early warning module having means for detecting the presence of personnel, means for determining the presence of ABC (Atomic, Biological and Chemical, now known as NBC, Nuclear, Biological and Chemical) hazards, which may be employed as weapons of mass destruction (WMD) within a shipping or cargo container and a means for communicating to remote station, it is to be understood that the various features of this invention can be used singly or in various combinations thereof in an early warning system as can hereinafter be appreciated from a reading of the following description. Furthermore, the showing of the embodiments in the figures is merely representative of the myriad of multiple purpose early warning modules for a multipurpose early warning system which can be constructed to accomplish the purposes of this invention and this invention is not to be limited in the scope by the figures presented.

Figure 1:
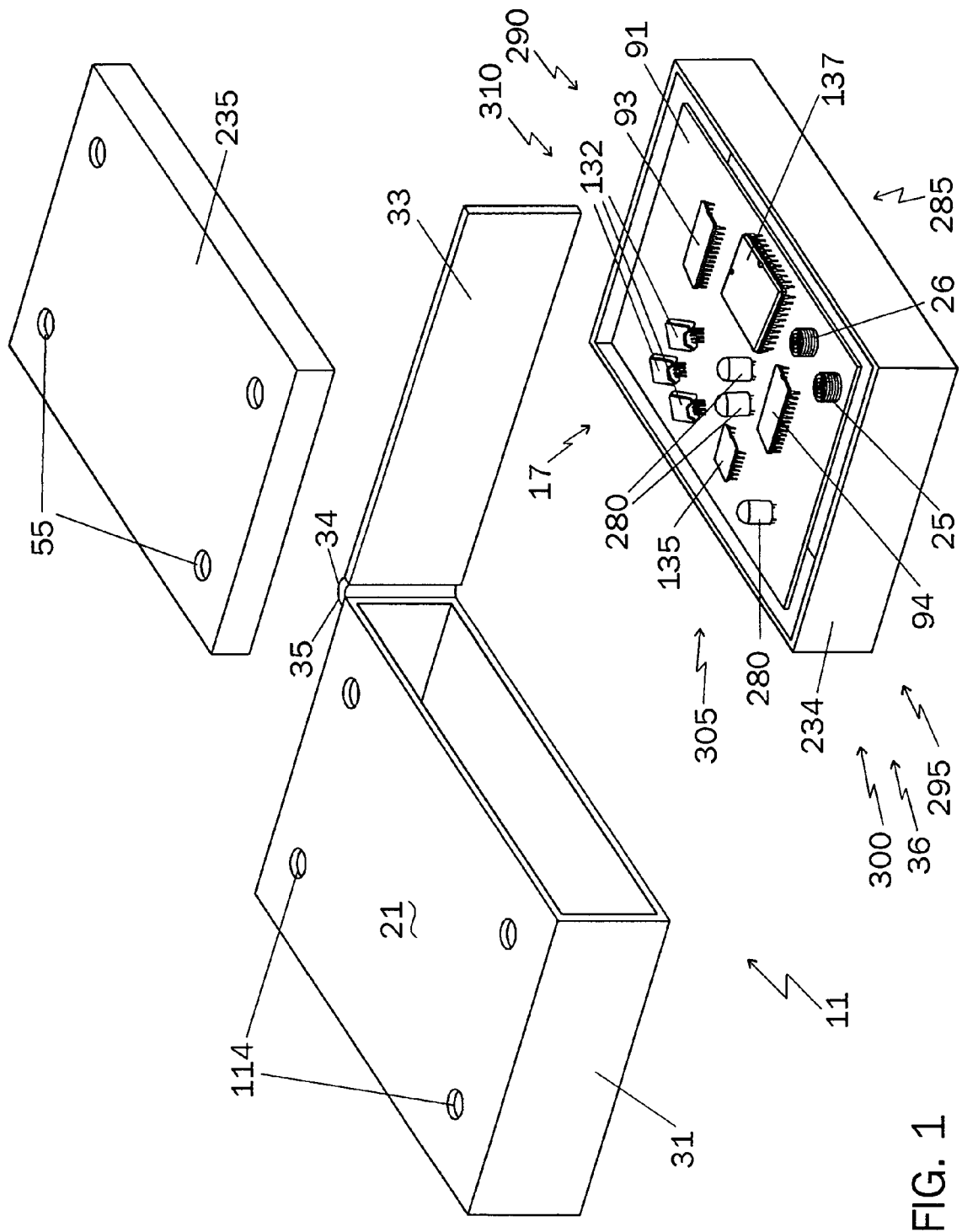
FIG. 1 is an exploded perspective view of the preferred multipurpose early warning module of this invention.
Figure 2:
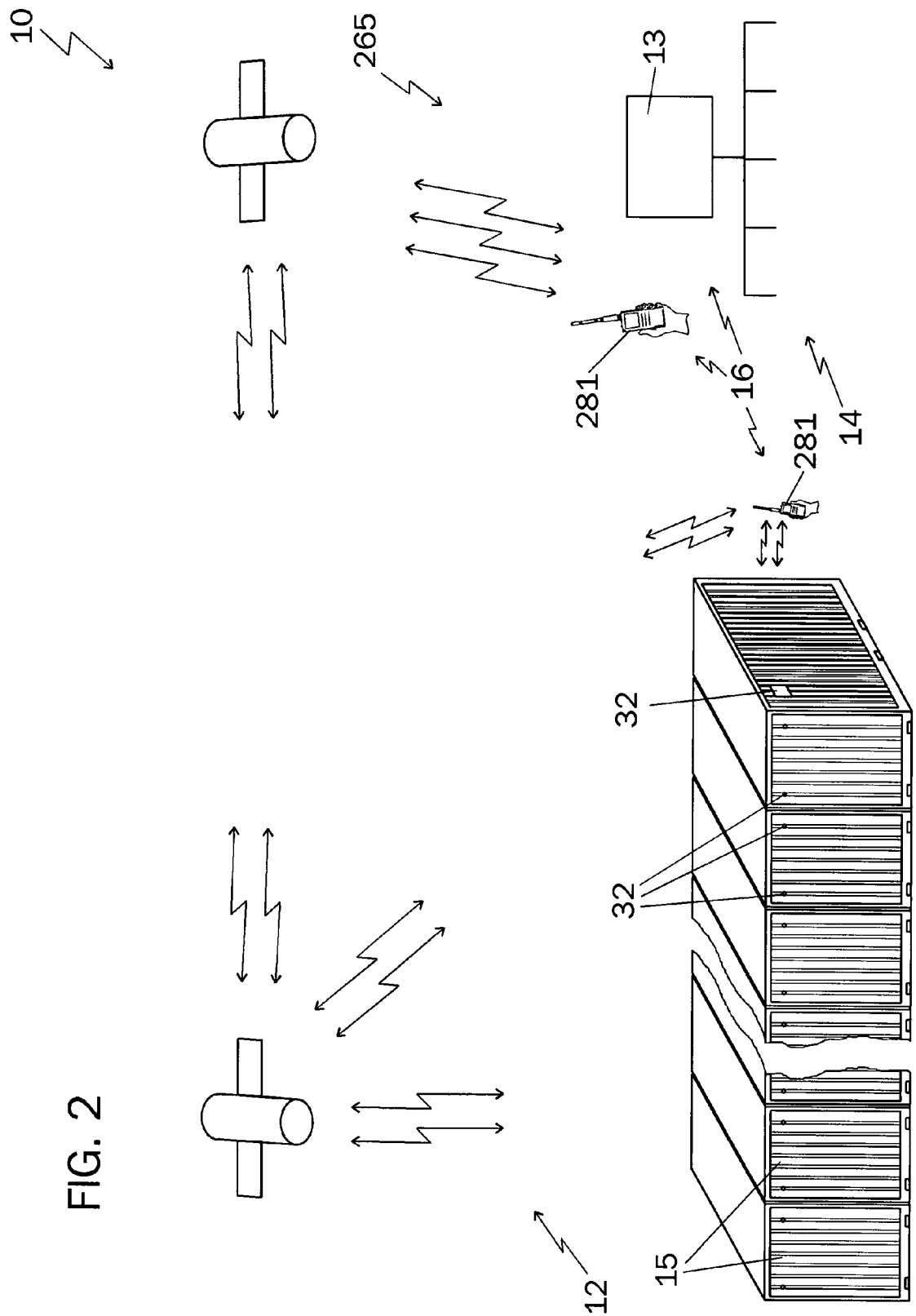
FIG. 2 is a schematic of the multipurpose early warning system of this invention.

A multipurpose early warning system, generally described by the numeral 10 in FIG. 2, comprises a multipurpose early warning sensor module 11, most accurately shown in FIG. 1, at least one remote station 265, at least one satellite communications system 12, at least one data processing center 13 and at least one end user communications system 14. Multipurpose early warning system 10 is primarily used to ensure the integrity of shipping containers 15 transported between a loading point and the user's unloading point. As hereinbefore stated, over 200 million cargo container shipments occur every year using the world's 12 million cargo containers. Few of these containers are inspected and none have any means for monitoring the integrity of the cargo. By installing at least one multipurpose early warning sensor module 11 in each shipping container 15, multipurpose early warning sensor module 11 activated to sense for the presence of persons, nuclear, chemical and/or biological material within each shipping container 15 after loading container 15 and indicating a null signal from a means for alerting 17 within multipurpose early warning sensor module 11 through satellite communication system 12, an end user accessing end user communication system 14 may be assured that the cargo carried by a specific shipping container 15 is safe for entry into the end user's facility. In the case that the cargo in a specific container 15 is determined to be breached by one of the NBC or weapons materials potentially used by terrorists, a data processing module 16, such as hand held transceiver 281, a laptop or stand alone computer (not shown), at either data processing center 13 or at the location of shipping container 15 is used to alert law enforcement and/or military authorities as to the presence of the material. Since satellite communication system 12 is used, a warning indicated by means for alerting 17 of multipurpose early warning sensor module 11 is immediately available and therefore the authorities may then inspect cargo container 15 while still en route and take necessary precautions to ensure that WMD do not enter the receiving port. In like manner, when container 15 is opened after initially loading, multipurpose early warning sensor module 11 will sense for opening of container 15 and/or for the presence of personnel entering container 15. Again, means for alerting 17 of multipurpose early warning sensor module 11 will provide an immediate alert for broadcast over satellite communication system 12 as well as to a receiver at the location of shipping container 15 wherein authorities may then apprehend the personnel attempting to remove or breach the cargo in container 15. Though the alert is preferably transmitted over satellite communication system 12, a localized alert is immediately generated as multipurpose early warning sensor module 11 has a local means for signaling 36 associated therewith, means for signaling 36 comprising at least one light assembly 32 mounted on at least one exterior surface of container 15, light assembly 32 lighted by means for alerting 17. Lighting assemblies 32 of means for signaling 36 may be mounted on each end 19 and/or on each side 18 of container 15, lighting assemblies 32 wired directly to multipurpose early warning sensor module 11. Preferably, lighting assemblies 32 are high intensity, high visibility red flashing lights mounted within the confines of the ribs 20 of container 15 thus providing protection to lighting assemblies 32. One lighting assembly 32 may be green in color, indicating a safe condition within container 15.

Referring now to FIG. 1, multipurpose early warning sensor module 11 carries a means for detection 305, a means for communicating 300, a means for alerting 17, means for identifying 310 upon a circuit board 91 and further carries elements of a means for signaling 36 on circuit board 91 with additional elements of means for signaling 36 associated therewith and with container 15. Means for detection 305 preferably comprises sensors 280 for sensing the presence of persons, nuclear, chemical and/or biological material that has been introduced into container 15 after closing and sealing. Therefore, more than one sensor 280 is present on circuit board 91 and it is fully understood that provisions are made for additional sensors 280 as detection technology advances. Sensors 280 may be selected from the group comprising air pressure sensors, temperature sensors, motion sensors, radiation sensors, biological agent sensors, chemical sensors or other sensors for detecting, qualifying and quantifying characteristics of environmental hazards, weapons and personnel. Examples of some sensors 280 employed within multipurpose early warning sensor module 11 are described hereinafter. Means for detection 305 is directly connected to means for alerting 17 and to means for identifying 310 through switching module 135 in order to properly identify to remote station 265 the particular hazard detected by means for detection 305 and to associate that hazard with the particular container 15 to which multipurpose early warning sensor module 11 is affixed. Immediate notification of the presence of a hazard is signaled at container 15 by means for signaling 36. It is fully within the scope of this invention to customize each multipurpose early warning module 11 specifically for a customer's needs. For instance, multipurpose early warning module 11 may be customized by having only sensors 280 for detecting motion solely for the purpose of identifying trafficking of illegal aliens across country borders. In another instance, sensors 280 may be installed in one multipurpose early warning module 11 to detect for biological agents and chemical agents for introduction of these foreign materials in containers 15 that are kept in unused storage for lengthy periods. Other configurations of sensors 280 within each multipurpose early warning module 11 may be designed as required. Alternately, sensors 280 for all hazards, light, air pressure and motion may be included in every multipurpose early warning module 11 wherein means for activating 290 activates certain sensors 280 as desired by each particular customer or according to each particular use of container 15.

Means for alerting 17 is an integral portion of the electronics of multipurpose early warning module 11, means for alerting 17 connected to command actuator 93 of means for activating 290, sensors 280, switching module 135 and means for communicating 300, means for alerting 17 activating switching module 135 which changes the state of external means for signaling 36 thus turning light assemblies 32 from green to red and feeding a positive signal to means for communicating 300 for transmitting an alert through a transmitter 94. Means for alerting 17 does not alter the state of means for signaling 36 when a null signal is output from all sensors, however, it is fully understood here, that any sensor 280 indicating a positive signal will cause means for alerting 17 to react. Means for communicating 300 transmits all data generated by means for detection 305 to at least one remote station 265 of multipurpose early warning system 10, remote station 265 providing information received from multipurpose early warning sensor module 11 to remote station 265, such as data processing center 13, hand held transceiver 281 or portable computer, through satellite communications system 12. Accordingly, null signals are also transmitted when all sensors 280 output a null signal thus indicating location of each multipurpose early warning sensor module 11 at the time of each transmission through transmitter 94. Readily apparent here is the fact that every container 15 may be continuously monitored for illegal activity, whether container 15 is empty, being loaded or in transit until multipurpose early warning sensor module 11 is deactivated by a signal from remote station 265 when the end user is ready to unload container 15. Remote station 265 makes available all information to end users through end user communications system 14.

Means for communicating 300 of multipurpose early warning sensor module 11 has means for receiving 285, means for transmitting 295 and means for activating 290 associated therewith wherein means for activating 290 receives instruction from remote station 265 through means for receiving 285 to place multipurpose early warning sensor module 11 into service, to change means for identifying 310 or to deactivate multipurpose early warning sensor module 11 when container 15 is readied for unloading. Generally, when container 15 is fully unloaded at a destination, the end user notifies remote station 265 that container 15 is fully unloaded and remote station 265, such as data processing center 13, sends a command to means for activating 290 which causes means for detection 305 of multipurpose early warning sensing module 11 to commence sampling and for means for transmitting 295 to commence transmitting data.

Multipurpose early warning module 11 has means for identification 310 which comprises a unique coded identification number specific to each multipurpose early warning sensing module 11 and a container code specific to a particular container 15. Means for identification 310 is preferably resident in at least one EEPROM chip 132 upon circuit board 91, three chips 132 shown for redundancy of identity. Remote station 265 assigns the unique identification code numbers for each multipurpose early warning module 11 by transmitting the code through means for receiving 285 and storing same in EEPROM chips 132 of means for identification 310. Thus, when remote station 265 addresses any one of said multipurpose early warning sensing modules 11 by transmitting the coded identification number associated with that particular multipurpose early warning sensing modules 11 and container 15, means for activating 290 is activated and receives further instruction from remote station 265. Alternately, multipurpose early warning module 11 may have a unique RFID programmed into means for receiving 285 and means for transmitting 295 for identifying multipurpose early warning module 11 and container 15, however, it is important to be able to alter the unique identifying mark of either multipurpose early warning module 11 and/or container 15. In some instances, it may be necessary to reassign a number to either multipurpose early warning sensing module 11 or container 15 and thus, remote station 265 addresses the particular multipurpose early warning sensing modules 11 associated with that container 15 and causes means for activating 290 to change the container code and/or multipurpose early warning sensing module 11 code in means for identifying 310. Such a circumstance may arise when a container 15 has been entered by personnel not associated with either the shipper or receiver of container 15 and it is desired to ensure that the integrity of container 15 is not later compromised by those unauthorized persons.

One sensor 280 of means for detection 305 has an initial state corresponding to an environmental condition wherein live human personnel should not be present, the initial state causing means for alerting 17 to indicate a null state, causes means for transmitting 295 to transmit a null condition and causes means for signaling 36 to signal a null state. However, the initial state is changed to a second state corresponding to an environmental condition consistent with the presence of live personnel when container 15 is opened, the second state causing means for alerting 17 to indicate a positive state, means for transmitting 295 to transmit an alert and means for signaling 36 to signal an alert. Another sensor 280 of means for detection 305 has an initial state corresponding to an environmental condition wherein biological hazards should not be present, that initial state causing means for alerting 17 to indicate a null state, means for transmitting 295 to transmit a null condition and means for signaling 36 to signal a null state. In like manner, upon entry of biological hazards into container 15, the initial state is changed to a second state corresponding to an environmental condition within container 15 consistent with the presence of biological hazards, the second state causing means for alerting 17 to indicate a positive state, means for transmitting 295 to transmit an alert and means for signaling 36 to signal an alert. Additionally, another sensor 280 of means for detection 305 acting independently of all other sensors 280 has an initial state corresponding to an environmental condition wherein radioactive material should not be present, the initial state causing means for alerting 17 to indicate a null state, means for transmitting 295 to transmit a null condition and means for signaling 36 to signal a null state. It should be readily apparent then that the initial state is changed to a second state corresponding to an environmental condition consistent with the presence of radioactive material when radioactive material is set loose in container 15, the second state causing means for alerting 17 to indicate a positive state, means for transmitting 295 to transmit an alert and means for signaling 36 to signal an alert. Although other sensors 280 may be employed for other purposes not recited in this invention, it is still within the scope of this invention to so provide. For instance, one sensor 280 of means for detection 305 has an initial state corresponding to an environmental condition wherein chemically hazardous material should not be present, the initial state causing means for alerting 17 to indicate a null state, means for transmitting 295 to transmit a null condition and means for signaling 36 to signal a null state but, the initial state is changed to a second state corresponding to an environmental condition consistent with the introduction or spillage of chemically hazardous material, the second state causing means for alerting 17 to indicate a positive state, said means for transmitting 295 to transmit an alert and means for signaling 36 to signal an alert. Hence, it should be apparent that multipurpose sensing module 11 for early warning security system 10 carries a plurality of sensors 280 for sensing a plurality of parameters wherein each of the plurality of sensors 280 outputs a null signal indicating absence of the sampling parameter for a particular sensor of the plurality of sensors 280 and wherein each of the plurality of sensors 280 outputs a positive signal indicating the presence of the sampling parameter for particular sensor 280. Furthermore, it should also be readily apparent that multipurpose sensing module 11 is set to sample at an interval selected from the group comprising random, continuous, timed and on command from a remote station 265 and activated by means for activating 290.

An air pressure sensor which may be employed within multipurpose early warning sensor module 11 is Model PD6 air pressure sensor available from Health & Energy Company, 3316 Augusta Avenue, Omaha, Nebr. 68144-4113. Air pressure sensor 280 is used to detect a sudden change in air pressure within container 15 which is indicative of opening of container 15. The sudden change in air pressure could signal unauthorized entry into container 15 and means for signaling 36 would be triggered, alerting local security personnel, and through means for communication 300 also alerting remote station 265 of the unauthorized entry. Other air pressure sensitive devices may be employed as air pressure sensor 280 without departing from the scope of this invention. In addition, sensors 280 for motion, such as FALCON Motion Sensor made by B.E.A. Inc., 100 Enterprise Drive, RIDC Park West, Pittsburgh, Pa. 15275 may be mounted to circuit board 91 of multipurpose early warning sensor module 11 which checks for motion above a threshold level in the vicinity of motion sensor 280 again triggering means for signaling 36 and means for communication 300 as switching module 135 is tripped when motion sensor 280 outputs a positive signal. The unauthorized entry indicated by motion sensor 280 can be addressed by local authorities who have been notified either by observing means for signaling 36 or alerted by remote station 265 over satellite communications system 12 or end user communication system 14. Motion sensors 280 from other sources may be substituted for motion sensor 280 without departing from the scope of this invention. Likewise, sensor 280 may be a vibration and shock sensor which can be used to determine unauthorized entry by detecting motion of the floor or walls of container 15. Unauthorized movement of container 15 may also be detected by shock and vibration sensor 280. One high shock accelerometer available on the market is the Model 383 offered by Columbia Research Laboratories, Inc., 925 Mac Dade Blvd., Woodlyn, Pa. 19094. Redundancy of any of the above sensors 280 may be provided by light change sensors which detect a change in ambient light using a light sensitive resistor. Light sensor 280 is available as PIR Sensor from Blue Point Engineering Inc. BPE Solutions, LLC, 213 Pikes Peak Place, Longmont, Colo. USA80501-3033. In like manner, temperature sensors, such as the DS600 offered by Maxim Integrated Products, Inc., 120 San Gabriel Drive, Sunnyvale, Calif. 94086 can sense the presence of body heat introduced by an unauthorized person entering container 15. Temperature sensor 280 is also useful in detecting a change in temperature of cargo carried in container 15 where a controlled environment is necessary. Though not a security issue, temperature of some products is critical and temperature sensors 280 will alert local personnel through means for signaling 36 while also alerting remote station 265 by means for communicating 300.

For detecting nuclear material which may be used for WMD, sensors 280 for detecting radiation are utilized. A typical radiation sensor 280 for mounting on circuit board 91 is model RM-BTD from Vernier Software & Technology, 13979 SW Millikan Way, Beaverton, Oreg. 97005-2886 though other radiation sensors 280 are available from other sources. Radiation sensor 280 checks for radiation, above a threshold level, the radiation emitted by decaying radioactive nuclear material. The threshold level may be sensed by radiation sensor 280 prior to loading container 15 and radiation sensor 280 reset accordingly to the threshold level for a null output thus avoiding triggering switching module 135 at the threshold level.

Means for detecting, differentiating and neutralizing biological or chemical hazards have been described in numerous papers on the subject. For instance, Caffrey, et al., in the article "Chemical Warfare Agent and High Explosive Identification by Spectroscopy of Neutron-induced Gamma Rays," IEEE Transactions on Nuclear Science, Vol. 39, No. 5 present an identification algorithm for identifying and differentiating between high explosives and chemical warfare agents, the article by Caffrey, et al., incorporated herein by this reference thereto. Another biological agent detector is described by McGowan, et al., in their article "Biological Agent Detector using a Surface Transverse Wave Resonator: Preliminary Report," 1994 IEEE MTT-S Digest, TU4D-4, incorporated herein by this reference thereto. Some sensors 280 rely on molecular mass measurements to detect CW and BW agents. These include the Chemical Agent Monitor (CAM) and the Chemical and Biological Mass Spectrometer (CBMS). One proven chemical Agent Monitor is supplied by Graseby Dynamics, Ltd. Briefly, it is a portable and battery-operated hand-held unit, capable of detecting blister (HD, HN3) and nerve (GB, VX) gases at levels which are below NATO requirements. Detection of these CW agents is achieved using the very well established ion-mobility mass spectrometer (IMS) technology. This technology has not only been successfully applied to CW detection, but is used extensively for environmental monitoring and industrial process monitoring.

Passive Fourier transform mid-infrared spectrometers (FT-IR); frequency agile mid-infrared carbon dioxide, ultraviolet fluorescence, 1.06 micron, and 2.0 micron LIDAR, Light Detection And Ranging systems; mid-infrared Mueller matrix ellipsometers; immunoassay coated fiber-optics and hybrid active-passive mid-infrared thermoluminescence spectrometer sensors 280 rely on optical measurements to detect CW and BW agents. Whether using optical or molecular mass measurements, sampling for key indicators as described in the aforementioned articles may be accomplished within housing 31, mounted within container 15, the results of the sampling being transmitted by a means for signaling 36 associated with integrated circuit boards 91. As best shown installed in instrument housing 234 in FIG. 1, means for signaling 36 comprises at least a switching module 135 associated with one of integrated circuit boards 91, means for signaling 36 having at least one light 32 being illuminated by switching module 135 to indicate hazard or safety and may further comprise transmitting antenna 26 associated with means for transmitting 295 transmitting to a remote station 265 the presence of the various ions detected for further analysis by personnel at the remote station 265. A receiving antenna 25 also associated with integrated circuit boards 91 is adapted to receive signals from the remote station 265 for activation of sampling sequences within housing 31. Receiving antenna 25 and transmitting antenna 26 are incorporated as a part of circuit board 91.

Figure 3:
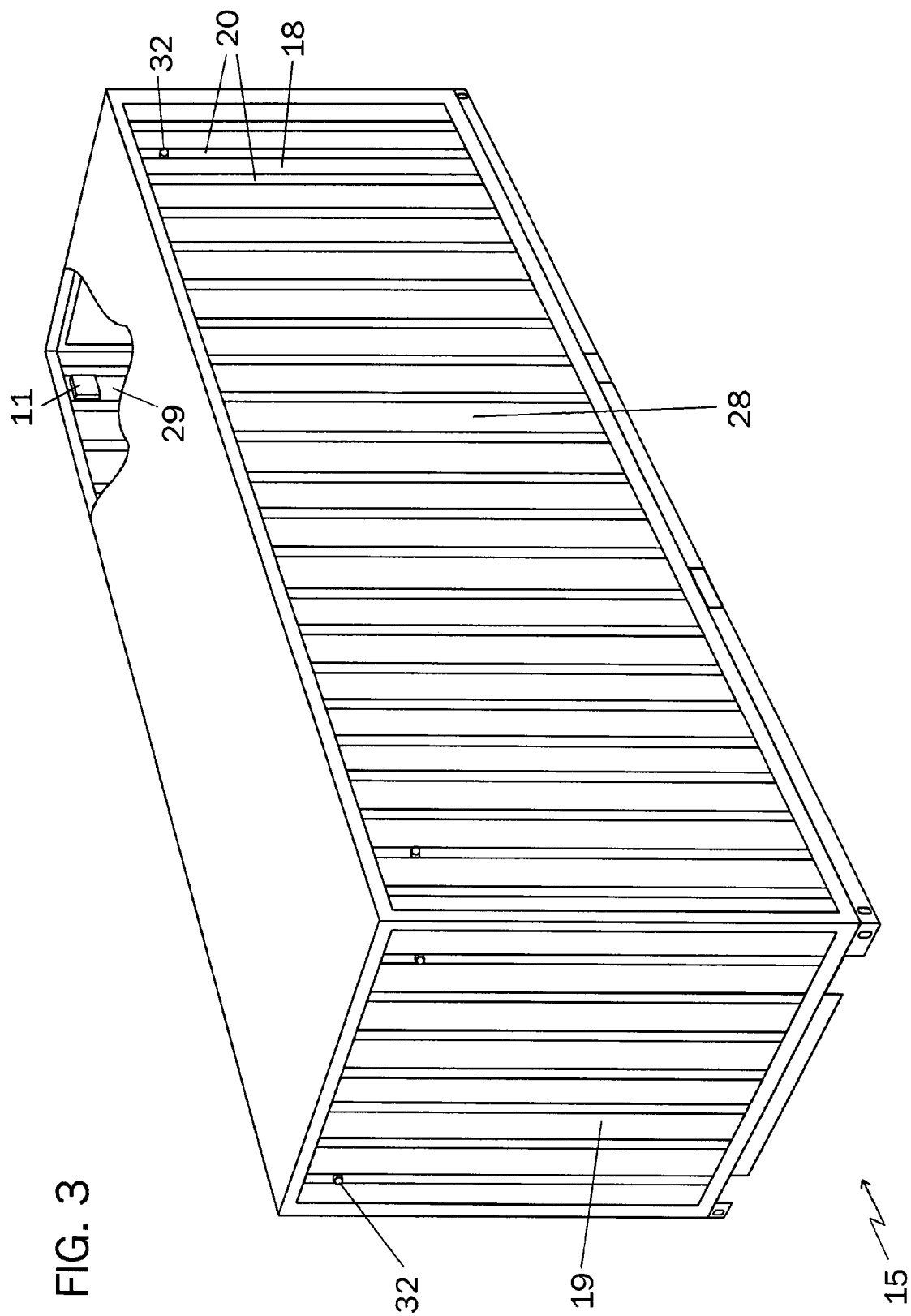
FIG. 3 is a view of a shipping container having a multipurpose early warning sensor module shown installed on an inside surface thereof in the breakaway portion.

Multipurpose sensing system 10 of detecting, qualifying and quantifying a potential threat to national security comprises multipurpose sensing module 11 associated with each cargo carrying container 15, multipurpose sensing system 10 tracking the instantaneous location of cargo carrying container 15. By having multiple sensors 280 on circuit board 91 mounted within housing 31 wherein each sensor 280 independently performs a different function, multipurpose sensing module 11 is adapted to sample the contents of container 15 for the presence of material selected from the group comprising nuclear, biological and chemical grade weapons material. Additionally, as described above and shown in FIG. 3, multipurpose sensing module 11 has external signaling lighting assembly 32 associated therewith, external signaling lighting assembly 32 disposed remote from multipurpose sensing module 11 and externally of cargo carrying container 15 wherein external signaling lighting assembly 32 is lighted when multipurpose sensing module 11 senses the presence of unauthorized material, external signaling lighting assembly 32 remaining activated until corrective action has been taken to neutralize the unauthorized material and return cargo carrying container 15 to a safe state. Preferably, external signaling lighting assembly 32 is a high intensity, high visibility flashing light and also is associated with a means for transmitting 295 transmitting to a satellite communication system 12 or to a local base station such as transceiver 281.

As hereinbefore stated, one preferred embodiment of multipurpose early warning system 10 comprises multipurpose early warning module 11 removably affixed to an inside surface 29 shipping container 15, however, it should be fully understood that multipurpose sensing module 11 may be portable for use adjacent container 15 when container 15 is being loaded. In fact, another preferred embodiment of this invention is a portable multipurpose sensing module 11 which may be carried by a loading authority or security official for use in detecting unauthorized material or personnel in or around containers 15 during the loading process. Portable multipurpose sensing module 11 may also be employed during transit of containers 15 for monitoring the environment in and around containers 15. Additionally, portable multipurpose early warning module 11 is useful in maintaining the integrity of empty containers 15 while containers 15 are idle by monitoring the environment in and around containers 15 while the onboard multipurpose early warning module 11 is in an inactive state. In fact, means for identifying 310 on portable multipurpose sensing module 11 may be used to input a container code for a specific container 15 for inventory purposes and to ensure that container 15 is free from hazards, WMD or personnel.

Preferably, multipurpose early warning module 11 is housed in a thermoplastic housing 31, housing 31 having a closable and lockable door 33. Door 33 has a living hinge 35 on one end 34 thereof though other hinging means may be employed. Housing 31 accepts a closable instrument housing 234 which slides neatly within housing 31 having door 33 closed thereupon. Instrument housing 234 carries integrated circuit board 91 with means for identifying 310, means for detecting 305, means for communicating 300, means for transmitting 295, means for activating 290, means for receiving 285 and means for alerting 17 mounted and secured thereupon. Circuit board 91 may further have circuit traces integrally formed therewith as is common in the art, however, circuit board 91 has components 93, 94, 132, 135, 137 and 280 integrally connected in order to accomplish the stated purpose. Instrument housing 234 preferably has a lid 235 which tightly fits over instrument housing 234, however, lid 235 has holes 55 therethrough for allowing vapors, scents and/or radioactive material to pass therethrough to sensors 280. Likewise, housing 31 has holes 114 through a top 21 thereof for allowing vapors, scents and/or radioactive material to pass.

Sensors 280 hereinbefore described as useful and other sensors which may be utilized with multipurpose early warning system 10 for other purposes are fully described in the textbook Sensors and Circuits by Joseph J. Carr, published by Prentice-Hall, Englewood Cliffs, N.J., 1993, incorporated herein by this reference thereto. Gas sensors particularly useful in multipurpose early warning system 10 are Taguchi Gas Sensors manufactured by Figaro, USA, Inc. Such gas sensors can detect very low level concentrations of various gases present in chemical warfare systems by measuring a resistance across a metal oxide or ceramic oxide surface and will recover to original resistance upon removal of the toxic gas. The gas sensors must fulfill many exploitation requirements; the most important parameters are: sensitivity, selectivity, reading reproducibility, stability during the operation, quick response, small size, safe operation, low power consumption, ~15 mW, and low cost. The resistance of the gas sensors used in multipurpose early warning system 10, is changed very quickly when exposed to a gas, and when removed from the gas, its resistance will recover to its original value after a short time. The speed of response and reversibility will vary according to the model of sensor and the gas involved, however the typical response time is within a few seconds.

Multipurpose early warning module 11 of multipurpose early warning system 10 preferably has a battery that provides power to means for detection 305, means for communicating 300, means for activating 290, means for identification 310, means for signaling 36 and circuit boards 91, however, it is within the scope of this invention to provide power through inductive coupling from remote station 265. It is also within the scope of this invention to supply power from an external source which may be transporting or storing container 15 or to have a power source integrated with container 15. Preferably, also, sensors 280 are activated in a rotation such that energy is conserved within multipurpose early warning module 11, though of course, it is possible to have all sensors 280 operating continuously, especially where an external source of power supplies an unlimited source of energy to multipurpose early warning module 11.

While the present invention has been described with reference to the above described preferred embodiments and alternate embodiments, it should be noted that various other embodiments and modifications may be made without departing from the spirit of the invention. Therefore, the embodiments described herein and the drawings appended hereto are merely illustrative of the features of the invention and should not be construed to be the only variants thereof nor be limited thereto.

I claim:

1. A multipurpose sensing module for a multipurpose early warning security system for a cargo transport container, said multipurpose sensing module comprising at least one circuit board, at least one power supply, a housing, a plurality of sensors for sensing a plurality of parameters, a means for communicating, a means for activating, a means for identification, a means for alerting, a switching module and a means for signaling, said plurality of sensors consisting of at least one sensor capable of detecting a presence of live humans, at least one sensor capable of detecting a biological hazard, at least one sensor capable of detecting a chemical hazard, and at least one sensor capable of detecting radioactive material thus constituting a means for detection of environmental hazards, weapons or personnel, wherein each particular sensor of said plurality of sensors independently performs a different function and has an initial state that outputs a null signal indicating absence of a sampling parameter associated with said particular sensor of said plurality of sensors and wherein said means for detection outputs a positive signal indicating presence of said sampling parameter for said particular sensor, said means for communicating transmitting data to at least one remote station, said at least one remote station providing information gathered by said multipurpose sensing module to a data processing center through a satellite communications system, said data processing center distributing said information to end users through an end user communications system.

2. A multipurpose sensing module as in claim 1 wherein a sampling sequence for each said sensor of said plurality of sensors is independently set to sample at an interval selected from the group comprising random, continuous and timed by said means for activating on command from said remote station.

3. A multipurpose sensing module as in claim 1 wherein said at least one circuit board, said at least one power supply, said sensors for sensing a plurality of parameters, said means for communicating said means for activating and said means for identification are securely mounted within said housing and said means for signaling is disposed external of said housing.

4. A multipurpose sensing module as in claim 3 wherein said means for signaling comprises at least one antenna.

5. A multipurpose sensing module as in claim 4 wherein said antenna of said means for signaling is affixed to an external wall of said housing.

6. A multipurpose sensing module as in claim 3 wherein said means for signaling comprises at least one signaling lighting assembly.

7. A multipurpose sensing module as in claim 6 wherein said signaling lighting assembly of said means for signaling is affixed to an external wall of said housing.

8. A multipurpose sensing module as in claim 7 wherein said signaling lighting assembly of said means for signaling is activated by said means for alerting when any sensor indicates a positive signal, said means for alerting activating a switching module which changes a state of said means for signaling.

9. A multipurpose sensing module as in claim 6 wherein said signaling lighting assembly of said means for signaling is disposed remote from said housing.

10. A multipurpose sensing module as in claim 9 wherein said signaling lighting assembly of said means for signaling is activated by said means for alerting when any sensor indicates a positive signal, said means for alerting activating a switching module which changes a state of said means for signaling.

11. A multipurpose sensing module as in claim 10 wherein said switching module of said means for alerting feeds a positive signal to a transmitter.

12. A multipurpose sensing module as in claim 9 wherein said signaling lighting assembly of said means for signaling is disposed on an external wall of said cargo container.

13. A multipurpose sensing module as in claim 9 wherein said signaling lighting assembly of said means for signaling is disposed remote from said cargo container.

14. A portable multipurpose sensing module for a cargo transport container, said multipurpose sensing module comprising at least one circuit board, at least one power supply, a housing, a plurality of sensors for sensing a plurality of parameters, a means for communicating, a means for activating, a means for identification, a means for alerting, a switching module and a means for signaling, said plurality of sensors consisting of at least one sensor capable of detecting a presence of live humans, at least one sensor capable of detecting a biological hazard, at least one sensor capable of detecting a chemical hazard, and at least one sensor capable of detecting radioactive material thus constituting a means for detection of environmental hazards, weapons or personnel, wherein each particular sensor of said plurality of sensors independently performs a different function and has an initial state that outputs a null signal indicating absence of a sampling parameter associated with said particular sensor of said plurality of sensors and wherein said means for detection outputs a positive signal indicating presence of said sampling parameter for said particular sensor, said means for communicating transmitting data to at least one remote station.

15. A portable multipurpose sensing module for a cargo transport container as in claim 14 which may be manually carried by persons selected from the group consisting of an authorized loading officer, security official, transporting master, authorized unloading officer, law enforcement personnel, surveillance personnel or military authority for detecting unauthorized material or personnel in or around said container during loading, transporting or unloading processes.

16. A portable multipurpose sensing module as in claim 14 which may be employed during transit of said container for monitoring the environment in and around said container.

17. A portable multipurpose sensing module as in claim 14 which is useful in maintaining integrity of said container while said container is empty by monitoring the environment in and around said container while an onboard multipurpose early warning module is in an inactive state.

18. A multipurpose sensing module for a cargo transport container, said multipurpose sensing module comprising at least one circuit board, a housing, a plurality of sensors for sensing a plurality of parameters, a means for communicating, a means for activating, a means for identification, a means for alerting, a switching module and a means for signaling, said plurality of sensors consisting of at least one sensor capable of detecting a presence of live humans, at least one sensor capable of detecting a biological hazard, at least one sensor capable of detecting a chemical hazard, and at least one sensor capable of detecting radioactive material thus constituting a means for detections of environmental hazards, weapons or personnel, wherein each particular sensor of said plurality of sensors independently performs a different function and has an initial state that outputs a null signal indicating absence of a sampling parameter associated with said particular sensor of said plurality of sensors and wherein said means for detection outputs a positive signal indicating presence of said sampling parameter for said particular sensor, said multipurpose sensing module receiving power from an external source.

19. A multipurpose sensing module as in claim 18 wherein said external source is associated with a vessel transporting said container.

20. A multipurpose sensing module as in claim 18 wherein said external source is remote from said multipurpose sensing module, said external source providing said power through inductive coupling.

* * * * *